US011567797B2

(12) United States Patent
Nadeau et al.

(10) Patent No.: US 11,567,797 B2
(45) Date of Patent: Jan. 31, 2023

(54) CLOUD APPLICATION SCALER

(71) Applicant: The Travelers Indemnity Company, Hartford, CT (US)

(72) Inventors: Jordan P. Nadeau, Wolcott, CT (US); Vijayabhaskar Tanamala, East Windsor, CT (US); Darin W. Swenson, Newport, MN (US); Micah K. Mogler, St. Paul, MN (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 603 days.

(21) Appl. No.: 16/587,875

(22) Filed: Sep. 30, 2019

(65) Prior Publication Data

US 2021/0096913 A1    Apr. 1, 2021

(51) Int. Cl.
| | |
|---|---|
| *G06F 9/46* | (2006.01) |
| *G06F 9/50* | (2006.01) |
| *G06N 5/04* | (2006.01) |
| *G06N 20/00* | (2019.01) |
| *H04L 67/10* | (2022.01) |
| *G06F 11/30* | (2006.01) |
| *G06F 11/34* | (2006.01) |

(52) U.S. Cl.
CPC .............. *G06F 9/50* (2013.01); *G06F 11/302* (2013.01); *G06F 11/3006* (2013.01); *G06F 11/3476* (2013.01); *G06F 11/3495* (2013.01); *G06N 5/04* (2013.01); *G06N 20/00* (2019.01); *H04L 67/10* (2013.01)

(58) Field of Classification Search
CPC ...... G06F 9/50; G06F 11/3006; G06F 11/302; G06F 11/3476; G06F 11/3495; G06F 9/45558; G06F 9/5072; G06F 9/5077; G06N 20/00; G06N 5/04; H04L 67/10
USPC ........................................................ 718/104
See application file for complete search history.

(56) References Cited

U.S. PATENT DOCUMENTS

| | | | |
|---|---|---|---|
| 2016/0142265 A1* | 5/2016 | Dube ................ | G06F 9/45558 709/223 |
| 2019/0087239 A1* | 3/2019 | Adibowo ................. | G06F 9/50 |
| 2019/0179647 A1* | 6/2019 | Deka ......................... | G06F 9/50 |
| 2020/0404051 A1* | 12/2020 | Guniguntala ....... | H04L 67/1029 |
| 2021/0028991 A1* | 1/2021 | Nataraj ................. | H04L 41/145 |
| 2021/0312277 A1* | 10/2021 | Prabhudesai .......... | G06N 3/084 |

* cited by examiner

*Primary Examiner* — Kenneth Tang
(74) *Attorney, Agent, or Firm* — Cantor Colburn LLP

(57) ABSTRACT

A system includes a processing system and a memory system. The memory system stores instructions for identifying a cloud application in a cloud environment as a non-disposable application and monitoring a plurality of instances of the non-disposable application running in the cloud environment. The instructions when executed by the processing system further result in determining that a number of the instances of the non-disposable application should be modified based on one or more demand predictions by an artificial intelligence scaler, adjusting the number of the instances of the non-disposable application running in the cloud environment based on the one or more demand predictions, and modifying an allocation of one or more resources of the cloud environment associated with adjusting the number of the instances of the non-disposable application.

26 Claims, 9 Drawing Sheets

CLOUD APPLICATION SCALER

BACKGROUND

In a cloud environment, resources are typically provisioned to meet processing, memory, and other demands of applications, which can change over time. Provisioning more resources than are needed can reduce the ability to invoke additional applications. Under-provisioning of resources can be problematic where applications demand more processing or memory resources than have been allocated. Cloud-based management tools can attempt to automatically adjust resource allocation to match demand if applications are structured to meet the interface and formatting requirements of the tools. However, legacy applications may not be able to interface correctly with the tools unless the underlying code is modified to comply with the requirements of the tools.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

Figure 1:
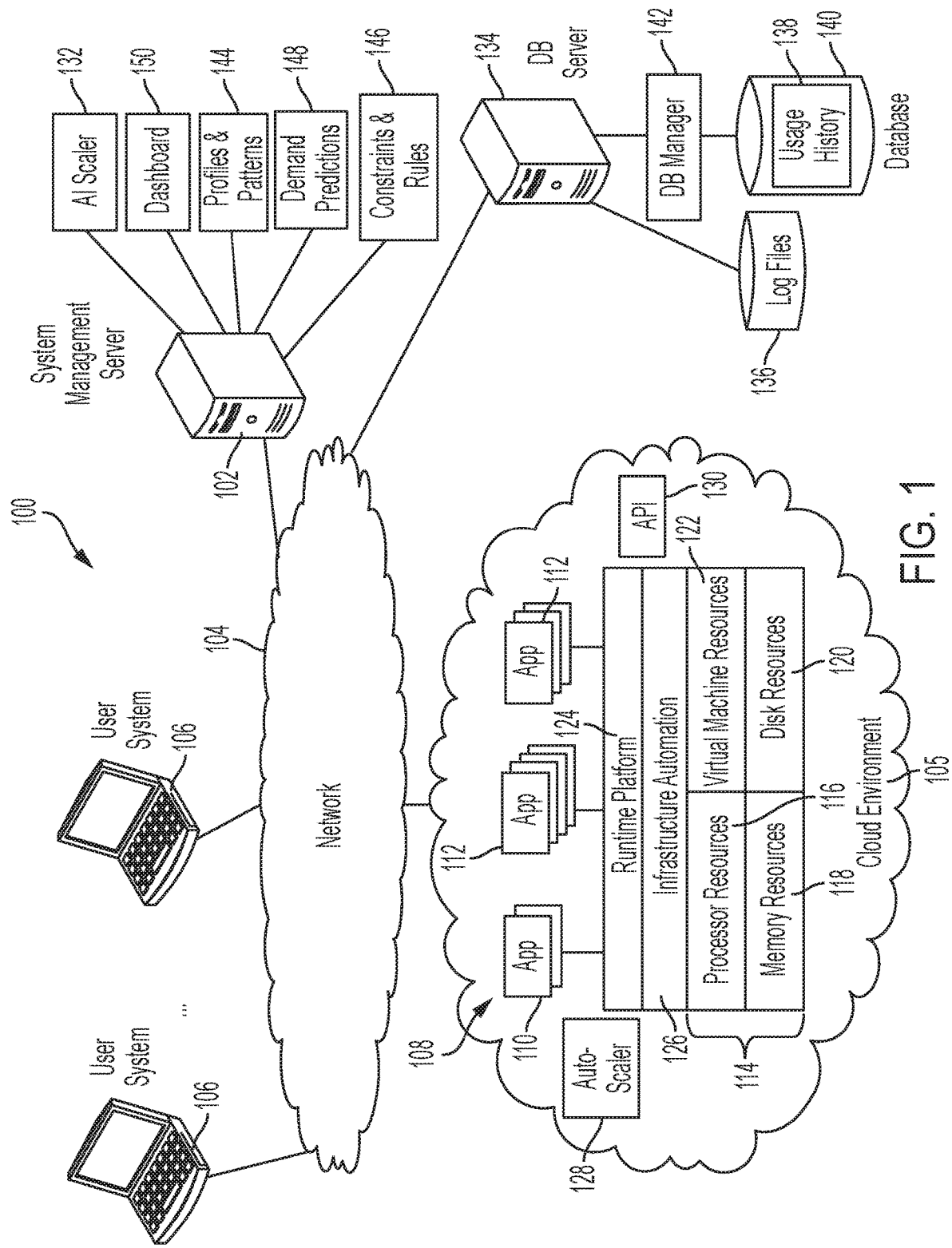
FIG. 1 depicts a block diagram of a system according to some embodiments of the present invention.

According to an embodiment, a system for an application cloud scaler is provided. The system can enable legacy applications that have not been configured as scalable or disposable applications with respect to a cloud environment to be scaled responsively and/or predictively. A scalable application in a cloud environment may be managed through a runtime platform and infrastructure automation to scale the amount of infrastructure resources needed to add instances (e.g., processes) of the application or reduce instances of the application. In order for the runtime platform to correctly understand the demands of applications, the applications are typically required to comply with multiple factors, e.g., twelve factors, such as a codebase, dependencies, configuration, backing services, delivery, stateless processes, port binding, concurrency, startup/shutdown, environment, log production, administrative processes, and the like. Applications deployed in the cloud environment that do not comply with the factors may be referred to as non-disposable applications, as an auto-scaler of the cloud environment may be unable to fully interface with such an application. Embodiments can include an artificial intelligence (AI) scaler that enables scaling of non-disposable applications within the cloud environment. Such an AI scaler can enable more effective management of computing resources within the cloud environment and thus provides technical benefits.

The AI scaler can dynamically scale up and scale down non-disposable applications in a cloud environment to reduce the risk of disposing of an application instance that is still processing or running an active session. The AI scaler enables non-disposable applications to execute similar to disposable applications, even though the non-disposable applications may not comply with twelve-factor application standards. The AI scaler can monitor resource utilization of a non-disposable application, such as processing and memory resource utilization, and monitor processes of the application so that processes finish prior to the reduction of resources for a scale down. As one example, the AI scaler can access utilization data of the non-disposable application periodically while the non-disposable application executes in the cloud environment. Utilization data can be processed to determine various metrics, such as normalized/idle processor usage of the application. Utilization data can be stored in log files or in a database for subsequent analysis by the AI scaler. As utilization data is collected over time for many application instances of the same or different non-disposable applications, patterns can be learned. The AI scaler can detect utilization spikes or idle periods and scale instances of the application up or down accordingly. The AI scaler can perform predictive scaling based on historical data. If patterns of high or low resource utilization are identified, the AI scaler can start more instances of a non-disposable application at specific times of day before the anticipated demand is realized. As startup times for some applications can take a substantial period of time, e.g., multiple minutes, having the applications started before the demand is realized can maintain efficient resource allocation. The AI scaler can learn to start the instances up ahead of time to anticipate an increased demand and have capacity ready.

Turning now to FIG. 1, a system 100 is depicted upon which application cloud scaling may be implemented. The system 100 includes a system management server 102 coupled to a network 104. The system management server 102 can access a cloud environment 105 through the network 104. The cloud environment 105 can execute a plurality of cloud applications 108, such as one or more instances of disposable applications 110 and one or more instances of non-disposable applications 112. A plurality of user systems 106 can interact with the cloud applications 108 and change the resulting demand in resources 114 needed to support execution of the cloud applications 108. For example, the resources 114 can include processor resources 116, memory resources 118, disk resources 120, and virtual machine resources 122. The processor resources 116 can be defined based on a fractional portion of central processing unit (CPU) capacity needed by an instance of the cloud applications 108. In some embodiments, depending on security constraints and/or other factors, the processor resources 116 can be allocated on a processing core basis, a device basis, or a virtual machine basis. The memory resources 118 can include short-term storage to support execution of a current instance of the cloud applications 108, such as volatile memory. The disk resources 120 can include persistent storage needs to retain values through power cycles, such as files and databases in non-volatile storage. The virtual machine resources 122 can be used to establish an operating environment for the cloud applications 108. The resources 114 of the cloud environment 105 are provisioned for use by the cloud applications 108 through a runtime platform 124 and infrastructure automation 126. The runtime platform 124 can provide support services for the cloud applications 108 to access the resources 114. The infrastructure automation 126 can determine which resources 114 should be allocated to the cloud applications 108 in response to requests through the runtime platform 124. The cloud environment 105 can also include an auto-scaler 128 operable to enable scaling of the disposable applications 110 to increase or decrease a number of instances of the disposable applications 110 and/or make adjustments to the provisioning of the resources 114 for the disposable applications 110 without the disposable applications 110 explicitly requesting the scaling. Further, the cloud environment 105 can include one or more application programming interfaces (APIs) 130 that provide access to services and usage information associated with the cloud applications 108, runtime platform 124, infrastructure automation 126, and/or resources 114.

The system management server 102 can include multiple applications and data external to the cloud environment 105. In the example of FIG. 1, the system management server 102 includes an AI scaler 132 that is configured to monitor performance of the non-disposable applications 112. Performance data collected from the cloud environment 105 can be written back to the system management server 102 or stored elsewhere, such as a database server 134, in log files 136 or as utilization data 138 in a database 140 managed by a database manager 142. As one example, the AI scaler 132 or another monitoring service (not depicted) can query the cloud environment 105 through the APIs 130 to determine a current allocation of the resources 114 by the non-disposable applications 112. Resulting logs associated with the non-disposable applications 112 can be written as log files 136 and further processed as usage history 138, which may include other values beyond those directly output through the APIs 130. As an example, the log files 136 may capture current utilization values, and the usage history 138 may include additional timing, system configuration data, and/or normalized values, depending upon the metrics of interest for the AI scaler 132 to further analyze. The database manager 142 can provide an interface for the AI scaler 132 to query and/or modify the usage history 138 in the database 140.

In embodiments, the AI scaler 132 can access the log files 136 and/or usage history 138 to determine profiles and patterns 144. The profiles and patterns 144 can summarize information, such as time-of-day, utilization of types of the resources 114 with the non-disposable applications 112, demands from user systems 106, demand correlations between multiple non-disposable applications 112, demand correlations with disposable applications 110, and other such associations. Constraints and rules 146 can be used and/or output as part of a training process of the AI scaler 132. Results of applying the constraints and rules 146 with the profiles and patterns 144 by the AI scaler 132 can result in demand predictions 148. The demand predictions 148 can predict when demand for the non-disposable applications 112 will likely increase or decrease. The AI scaler 132 can use the demand predictions 148 to trigger responses to scale up or scale down instances of the non-disposable applications 112 prior to occurrence of the change in demand. For example, if a time-of-day pattern is identified for one or more of the non-disposable applications 112, and a scale-up time in known, the AI scaler 132 can initiate a scale-up operation such that the scale-up time aligns with the time of a predicted need for adding instances of the non-disposable applications 112. As a further example, if an association pattern is identified between multiple cloud applications 108, a change in demand for a cloud application 108 can trigger a predictive scaling of an associated cloud application 108 prior to an explicit request for scaling. When down-scaling is predicted, the AI scaler 132 can send a transaction blocking request through the APIs 130 to block new transactions from being initiated through a non-disposable application 112, such that any open transactions in progress can complete before scaling down and re-enabling transactions to the non-disposable application 112.

In some embodiments, the log files 136 may be received in different formats, depending upon an application type of the non-disposable applications 112. To normalize formatting differences, the database 140 may be a schema-less database that stores records converted from application-specific data objects to a common format in the usage history 138, such as a JavaScript Object Notation (JSON) format. In other embodiments, the database 140 can comprise a relational database or other architecture known in the art.

A system management server 102 can access the database 140 through the database manager 142 to analyze records of usage history 138 stored therein. The system management server 102 can display a summary of the usage history 138 through a dashboard 150. The dashboard 150 may include a combination of trends, data values, gauges, allocation splits, and the like. Further, the AI scaler 132 executing on the system management server 102 can monitor resource allocation, trigger alerts, and determine resource allocation adjustment requests for the non-disposable applications 112 based on various thresholds that can also be monitored through the dashboard 150. The system management server 102 and the database server 134 can comprise separate servers coupled to the network 104. Further, the system management server 102 and the database server 134 can be combined with each other or with one or more other servers (not depicted).

In the example of FIG. 1, each of the system management server 102, user systems 106, and database server 134 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the system management server 102, processor resources 116, and/or database server 134.

The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 can be operated by users of cloud applications 108 and/or administrators.

Each of the system management server 102, user systems 106, and database server 134 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The network 104 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 104 may be implemented using a wired network, an optical network, a wireless network, and/or any kind of physical network implementation known in the art.

Figure 2:
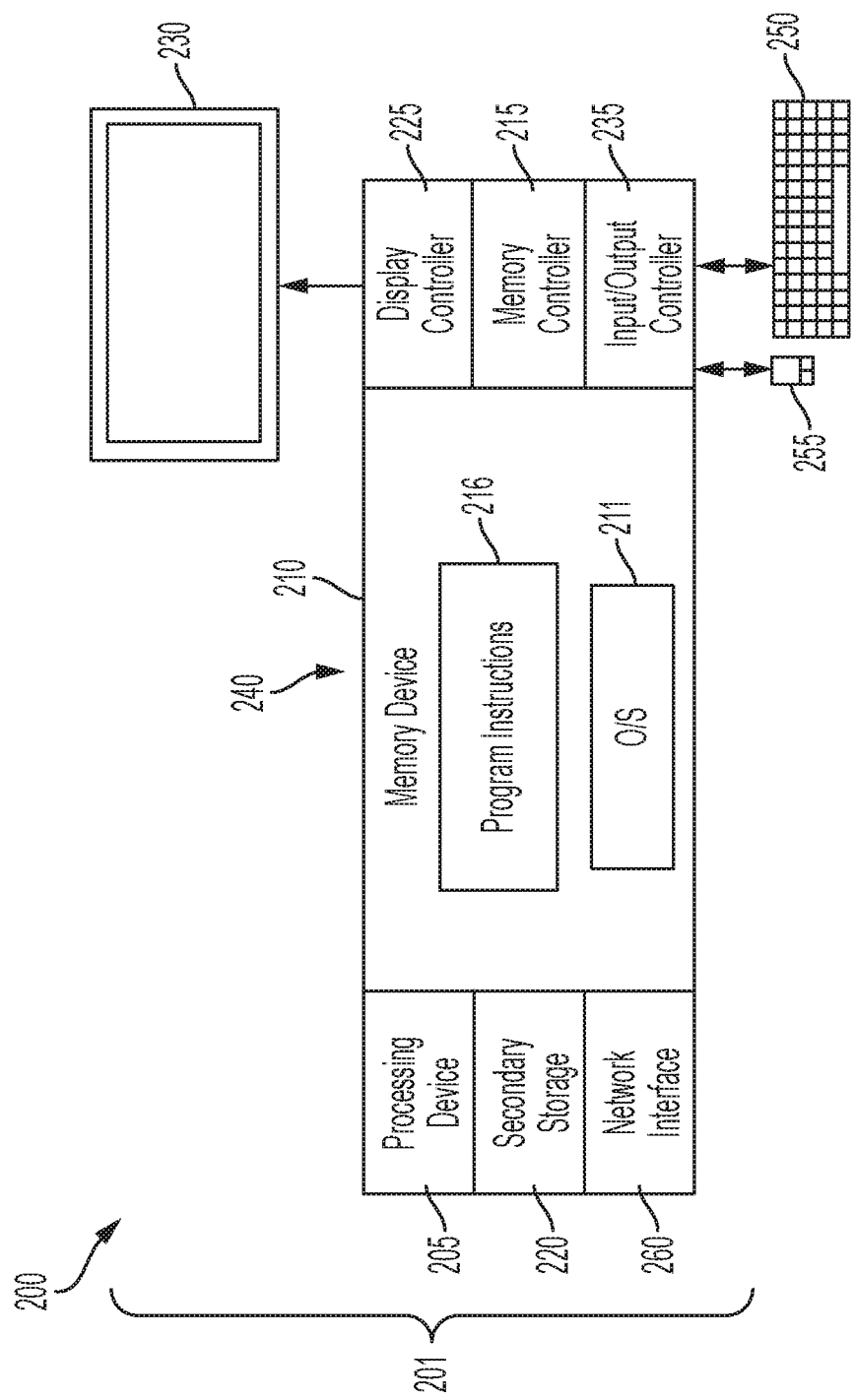
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the system management server 102, user systems 106, or database server 134 of FIG. 1.

In an exemplary embodiment, in terms of hardware architecture, as shown in FIG. 2, the computer 201 includes a processing device 205 and a memory device 210 coupled to a memory controller 215 and an input/output controller 235. The processing device 205 can also be referred to as a processing system 205 and may include multiple processors (e.g., one or more multi-core processors). The memory device 210 can also be referred to as a memory system 210 and may include multiple types of memory in various configurations, such as a combination memory cards and memory chips with volatile and/or non-volatile storage capacity. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom-made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the cloud applications 108, AI scaler 132, database manager 142, and/or dashboard 150 of FIG. 1.

The computer 201 of FIG. 2 also includes a network interface 260 that can establish communication channels with one or more other computer systems via one or more network links of the network 104 of FIG. 1. The network interface 260 can support wired and/or wireless communication protocols known in the art. For example, when embodied in the system management server 102 of FIG. 1, the network interface 260 can establish communication channels with at least one of the cloud environment 105 of FIG. 1 and the database server 134 of FIG. 1 via the network 104 of FIG. 1.

Figure 3:
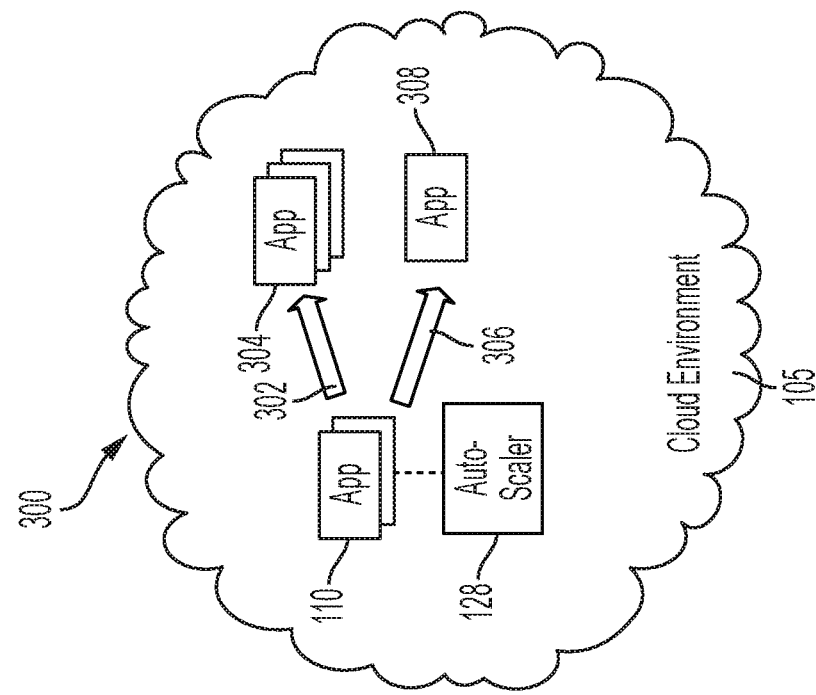
FIG. 3 depicts a block diagram of interactions between a disposable application and an auto-scaler according to some embodiments of the present invention.

FIG. 3 depicts an example of a block diagram 300 of interactions between the auto-scaler 128 and a disposable application 110 according to an embodiment and is described in reference to FIGS. 1-3. Within the cloud environment 105, the auto-scaler 128 can comprise part of the runtime platform 124 of FIG. 1 to scale up 302 the disposable application 110 by creating one or more additional instances 304 of the disposable application 110 to meet increased demands. The auto-scaler 128 can monitor and react to demands on the disposable application 110 based on multi-factor compliance of the disposable application 110. When the demands on the disposable application 110 drop, such as during an idle period or after a peak demand is reduced, the auto-scaler 128 can scale down 306 the disposable application 110 with reduced instances 308 to align with the decreased demand.

Figure 4:
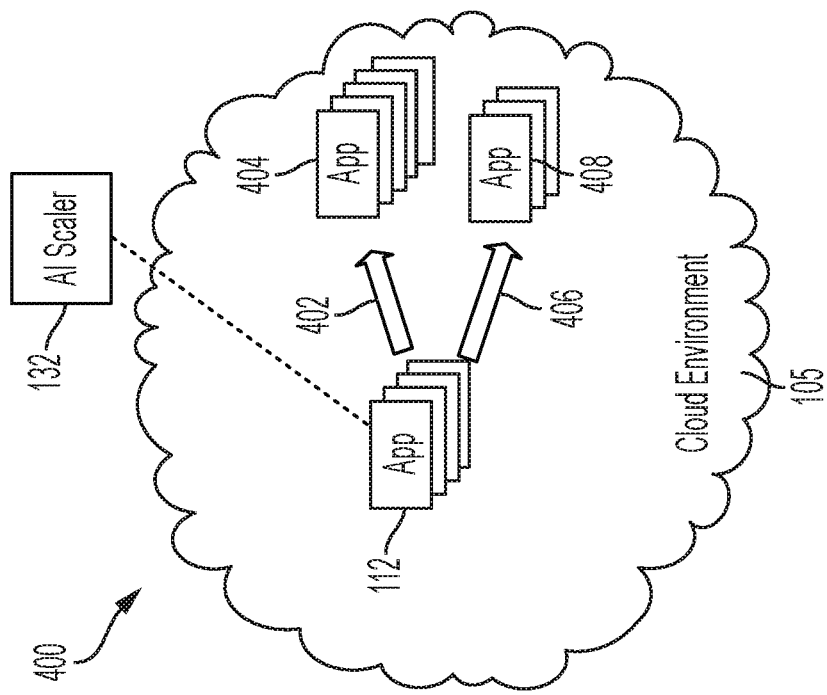
FIG. 4 depicts a block diagram of interactions between a non-disposable application and an artificial intelligence scaler according to some embodiments of the present invention.

FIG. 4 depicts an example of a block diagram 400 of interactions between the AI scaler 132 and a non-disposable application 112 according to an embodiment and is described in reference to FIGS. 1-4. The AI scaler 132 operates external to the cloud environment 105, and the non-disposable application 112 is configured to execute within the cloud environment 105. The AI scaler 132 can monitor the non-disposable application 112 and predictively scale up 402 the non-disposable application 112 by creating one or more additional instances 404 of the non-disposable application 112 to meet predicted increases in demand. The AI scaler 132 can monitor and predict demands on the non-disposable application 112 based on demand predictions 148. When the demands on the non-disposable application 112 are predicted to drop, such as an anticipated idle period or after a peak demand is likely to reduce, the AI scaler 132 can predictively scale down 406 the non-disposable application 112 with reduced instances 408 to align with the predicted decrease in demand. The predicted decrease can result in blocking the servicing of new transactions to allow existing transactions to complete before the scale down 406 and continue servicing of new transactions after the scale down 406 is completed. In some embodiments, the AI scaler 132 can also perform reactive/nonpredictive scaling in response to an unexpected change in demand. As demand changes continue over time, the AI scaler 132 can continue to refine constraints and rules 146 used to make the demand predictions 148.

Figure 5:
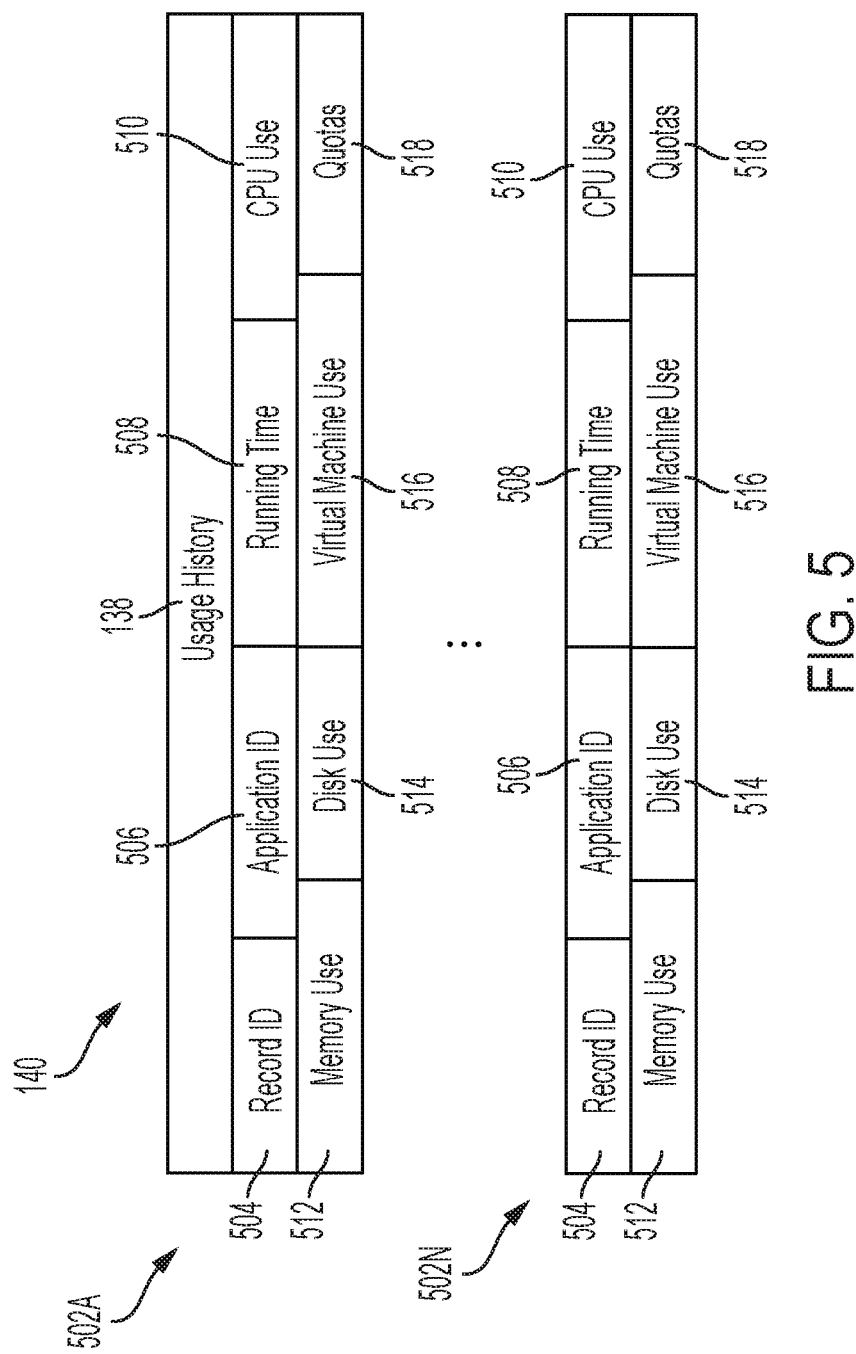
FIG. 5 depicts a block diagram of types of data that can be captured in usage history and/or log files according to some embodiments of the present invention.

FIG. 5 depicts a block diagram of types of data that can be captured in usage history 138 of the database 140 of FIG. 1. As an example, the usage history 138 can include a plurality of records 502A-502N to capture information, such as a record identifier 504, an application identifier 506, a running time 508, a processor usage 510, a memory usage 512, a disk usage 514, virtual machine usage 516, and various quotas 518. The record identifier 504 can be used to track unique records 502A-502N and sequencing of historical data. The application identifier 506 can indicate which of the non-disposable applications 112 is associated with a particular copy of a record 502A-502N. The running time 508 can indicate how long the non-disposable application 112 has been running since instantiation or other event. The processor usage 510 can indicate a processing load as a relative value, ratio, instruction execution throughput, or other such processing metric of the processor resources 116 consumed by the non-disposable application 112. The memory usage 512 may indicate a total amount of volatile memory of memory resources 118 consumed by the non-disposable application 112. The disk usage 514 can indicate a total amount of non-volatile memory of disk resources 120 consumed by the non-disposable application 112. The virtual machine use 516 can indicate types and amounts of virtual machine resources 122 consumed by the non-disposable application 112. The quotas 518 may indicate allocation limits for one or more of the processor resources 116, memory resources 118, disk resources 120, and virtual machine resources 122. Quotas 518 may be defined per application instance or aggregated across multiple instances of the non-disposable application 112. Quotas 518 can also account for effects of disposable applications 110 on utilization of the resources 114.

Although the example of FIG. 5 depicts various types of data that can be captured in records 502A-502N, it will be understood that many variations are contemplated. For example, values can represent a time sequence history or can blend/average data over time. As an example, values may be peak values, current values, minimum values, average values, weighted values, or the like. Further, other types of data can include host address, ports, network resource usage, inter-application communication records, and other such data.

Figure 6:
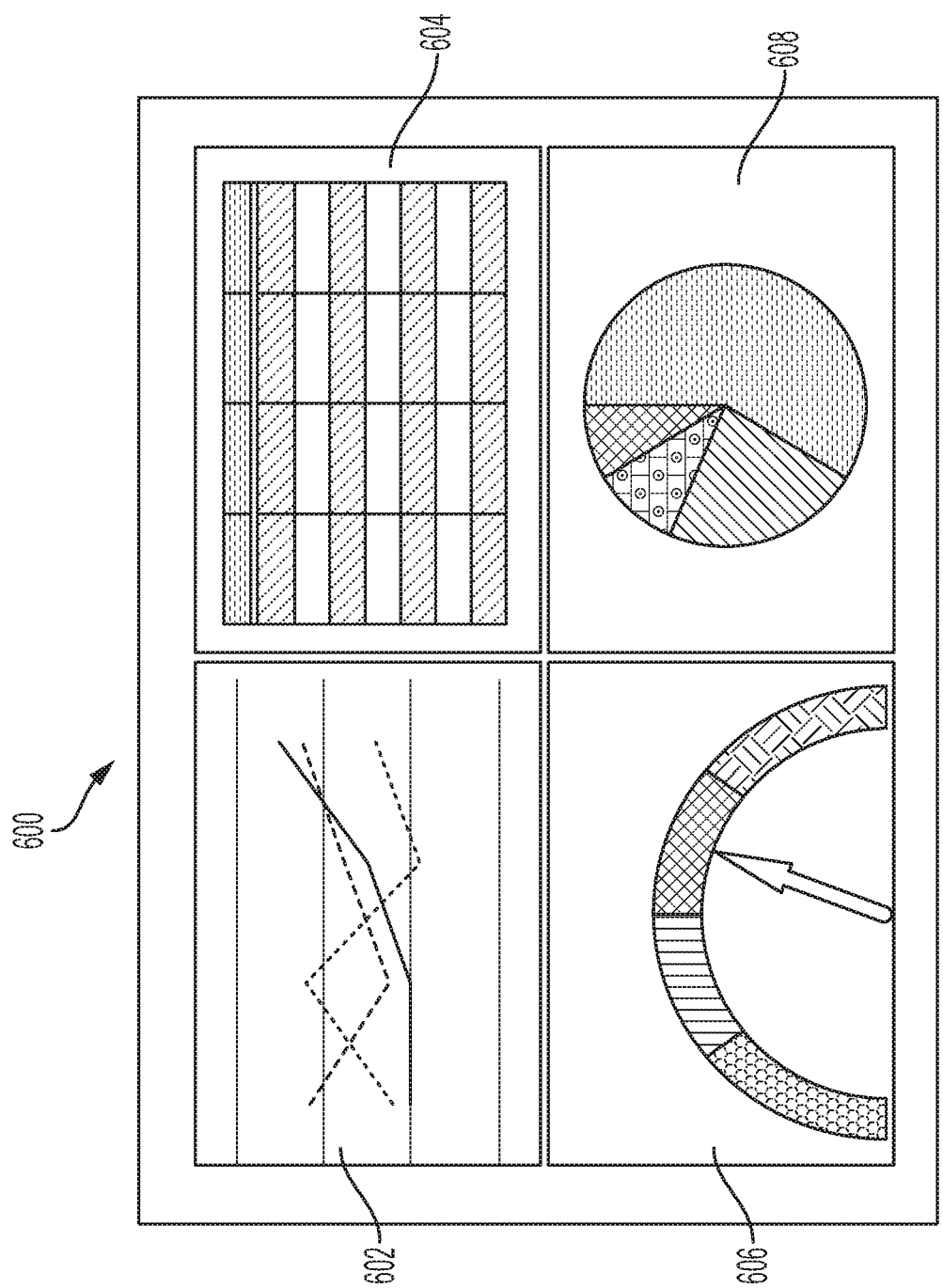
FIG. 6 depicts a simplified example of a dashboard according to some embodiments of the present invention.

FIG. 6 depicts a simplified example of a dashboard 600 as a simplified visual example of the dashboard 150 of FIG. 1. The dashboard 600 may include a combination of trends 602, data values 604, gauges 606, allocation splits 608, and the like. The trends 602 may illustrate changes in usage of resources 114 of FIG. 1 for one or more non-disposable applications 112 of FIG. 1 over a period of time. The data values 604 can support inspection of detailed values captured in the usage history 138 of FIG. 1 or from other sources. The gauges 606 can indicate current performance level or usage of the resources 114 relative to a maximum allowable value, such as quotas 518 of FIG. 5. The allocation splits 608 may display relative allocations of resources 114 between multiple non-disposable applications 112, for instance, as a pie chart. Other types of indicators on the dashboard 600 are contemplated. As one example, a utilization heat map can be depicted with color coding or other visual indications to identify how close utilization of one or more of the resources 114 is to one or more resource limits at time intervals over a selected date/time range. The dashboard 600 can adjust a display parameter of one or more values that exceed one or more resource limits on one or more visual depictions (e.g., green <50%, yellow 51% to 59%, orange 60% to 74%, red>=75%). The utilization heat map can be selectable to display average memory and/or processing resource utilization across discrete time intervals that may be user configurable/adjustable.

Figure 7:
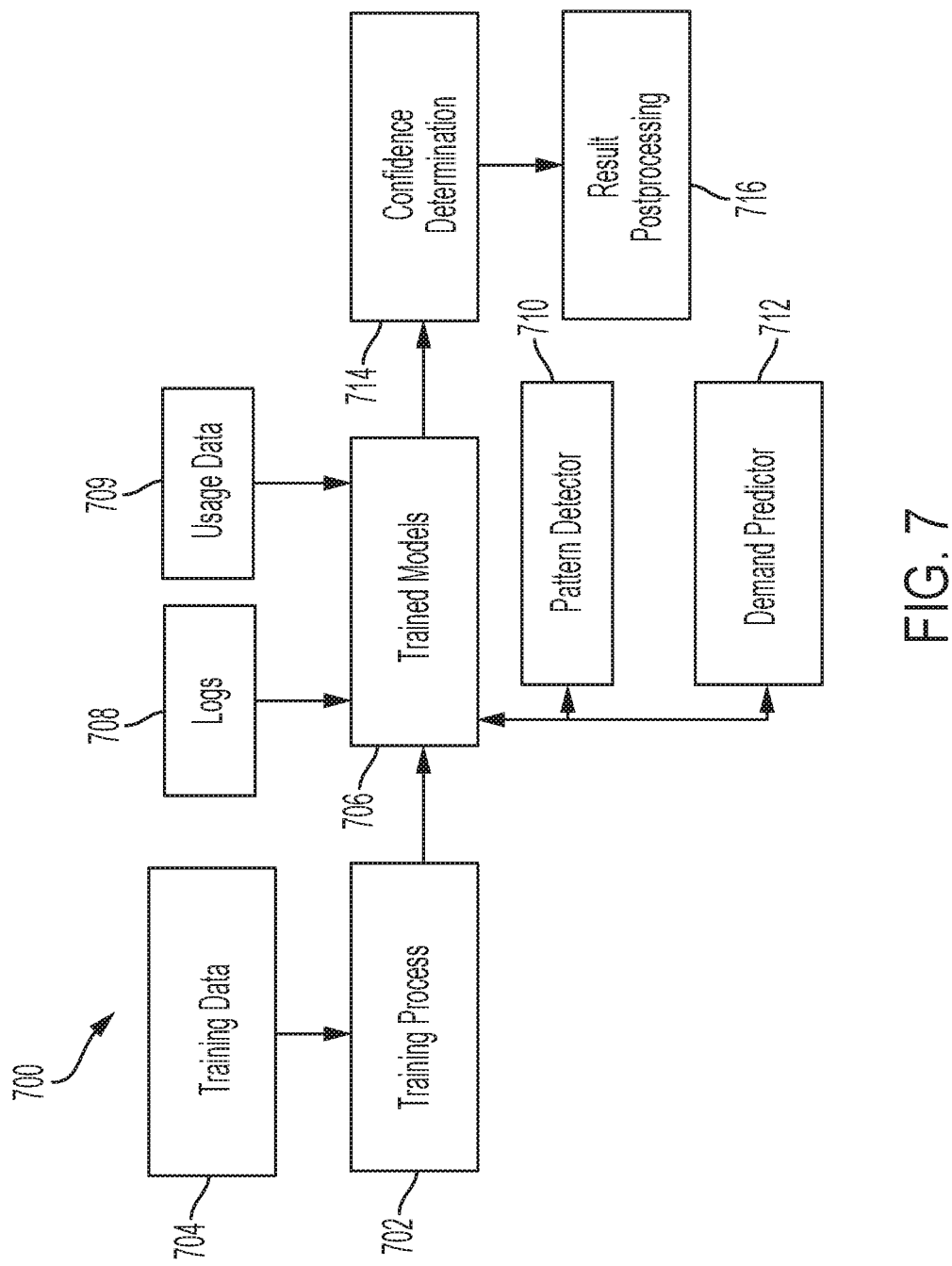
FIG. 7 depicts a training and prediction process according to some embodiments of the present invention.

FIG. 7 depicts a training and prediction process 700 according to some embodiments. The training and prediction process 700 can include a training process 702 that analyzes training data 704 to develop trained models 706 as examples of a pattern detector 710 and demand predictor 712. The training process 702 can use labeled or unlabeled data in the training data 704 to learn features, such as a resource usage and correlation between applications. The training data 704 can include a set of historical resource utilizations and other data to establish a ground truth for learning coefficients/weights and other such features known in the art of machine learning to develop trained models 706. The trained models 706 can include a family of models to identify specific types of features from logs 708 and/or usage data 709. The logs 708 can be extracted directly from the cloud environment 105 of FIG. 1 or log files 136 of FIG. 1. The usage data 709 can comprise fields extracted from the records 502A-502N of FIG. 5 as part of usage history 138 of FIG. 1. The trained models 706 can include the pattern detector 710 as part of the AI scaler 132 of FIG. 1 to produce the profiles and patterns 144 of FIG. 1. The demand predictor 712 can be part of the AI scaler 132 to produce demand predictions 148. Other such models and further subdivision of the trained models 706 can be incorporated in various embodiments.

The trained models 706 can output a confidence determination 714 indicating a confidence level of a detected pattern or demand prediction. Result postprocessing 716 can determine an action to take based on the confidence and whether a scale up or scale down is likely needed presently or at a predicted future time. Result postprocessing 716 may also format results for display in the dashboard 150 of FIG. 1 or for triggering of alerts and other events by the system management server 102 of FIG. 1.

Figure 8:
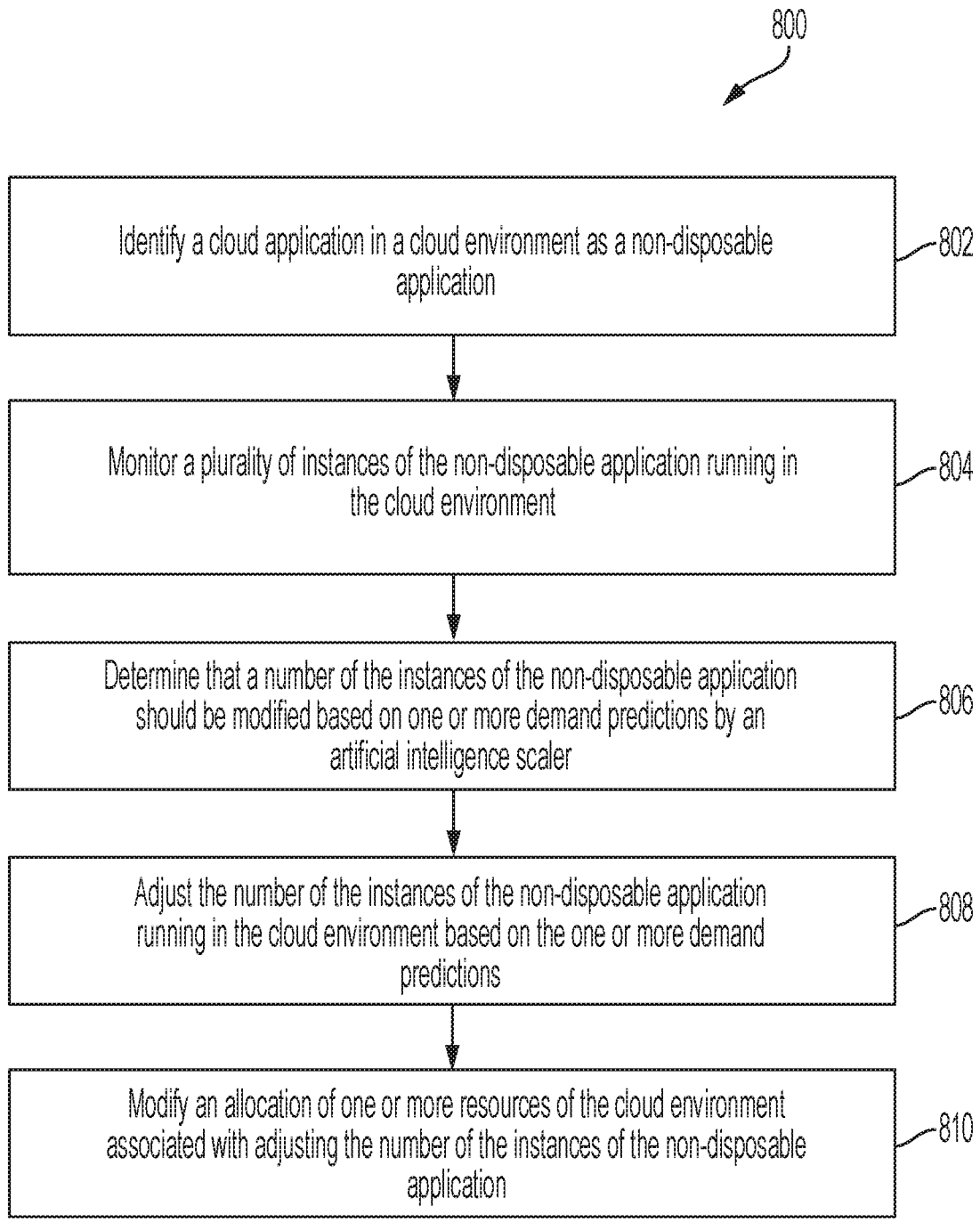
FIG. 8 depicts a process flow according to some embodiments of the present invention.

Turning now to FIG. 8, a process flow 800 is depicted according to an embodiment. The process flow 800 includes a number of steps that may be performed in the depicted sequence or in an alternate sequence. The process flow 800 may be performed by the system 100 of FIG. 1. In one embodiment, the process flow 800 is performed by the system management server 102 of FIG. 1 in combination with the cloud environment 105 and database server 134. Although the example of process flow 800 is described in reference to the system management server 102, the process flow 800 applies to any combination of depicted servers, as well as one or more additional servers (not depicted). The process flow 800 is described in reference to FIGS. 1-8.

At step 802, the AI scaler 132 can identify a cloud application 108 in the cloud environment 105 as a non-disposable application 112. Identifying the non-disposable application 112 can include performing a multi-factor check of the cloud application 108 to determine whether the cloud application 108 complies with a plurality of design constraints to support dynamic deployment in the cloud environment 105. The design constraints can be defined in the constraints and rules 146. The cloud application 108 can be identified as a disposable application 110 based on determining that the cloud application 108 complies with the design constraints to support dynamic deployment in the cloud environment 105, or the cloud application 108 can be identified as the non-disposable application 112 based on complying with less than a predetermined number of the design constraints (e.g., less than twelve).

At step 804, the AI scaler 132 can monitor a plurality of instances of the non-disposable application 112 running in the cloud environment 105. Monitoring the instances of the non-disposable application 112 running in the cloud environment 105 can include monitoring usage of one or more resources 114 associated with the non-disposable application 112 in the cloud environment 105. The one or more resources 114 can include a combination of one or more of processor resources 116, memory resources 118, disk resources 120, and virtual machine resources 122. Monitoring the plurality of instances of the non-disposable application 112 running in the cloud environment 105 can be performed at a predetermined time interval through an API 130 of the cloud environment 105.

At step 806, the AI scaler 132 can determine that a number of the instances of the non-disposable application 112 should be modified based on one or more demand predictions 148 of the AI scaler 132. The one or more demand predictions 148 can be based on detecting one or more patterns indicative of a resource demand increase or a resource demand decrease. The AI scaler 132 can comprise a software service executed remotely from the cloud environment 105. The AI scaler 132 can be trained with a plurality of test loads in training data 704 applied to the one or more resources 114 of the cloud environment 105.

At step 808, the AI scaler 132 can adjust the number of the instances of the non-disposable application 112 running in the cloud environment 105 based on the one or more demand predictions 148. At step 810, the AI scaler 132 can modify an allocation of one or more resources 114 of the cloud environment 105 associated with adjusting the number of the instances of the non-disposable application 112. Steps 808 and 810 can be performed in any order or combined. For example, modification of the allocation of resources in step 810 can be performed in response to a request to change the number of instances of the non-disposable application 112 prior to execution of new instances of the non-disposable application 112. Further, as resource needs associated with a change in the number of instances of the non-disposable application 112 result in a modified resource demand, the one or more resources 114 can be adjusted to meet the change during execution. In some embodiments, an autoscaler 128 associated with the cloud environment 105 can be used to scale up and scale down a cloud application 108 based on determining that the cloud application 108 is a disposable application 110. An alert can be issued based on detection by the AI scaler 132 of one or more irregular patterns of resource demands. The alert can be output to the dashboard 150 or sent to an administrator system. Irregular patterns can be identified based on a level of deviation from one or more expected patterns of resource demands. The patterns can be captured and updated as part of the profiles and patterns 144.

Where log files 136 are used, a plurality of results of monitoring the instances of the non-disposable application 112 can be written into a log file 136 at a first interval. The AI scaler 132 can analyze content of the log file 136 to identify one or more patterns at a second interval. For instance, log files 136 can be populated by taking samples every few minutes while pattern observation may be in intervals of hours.

Figure 9:
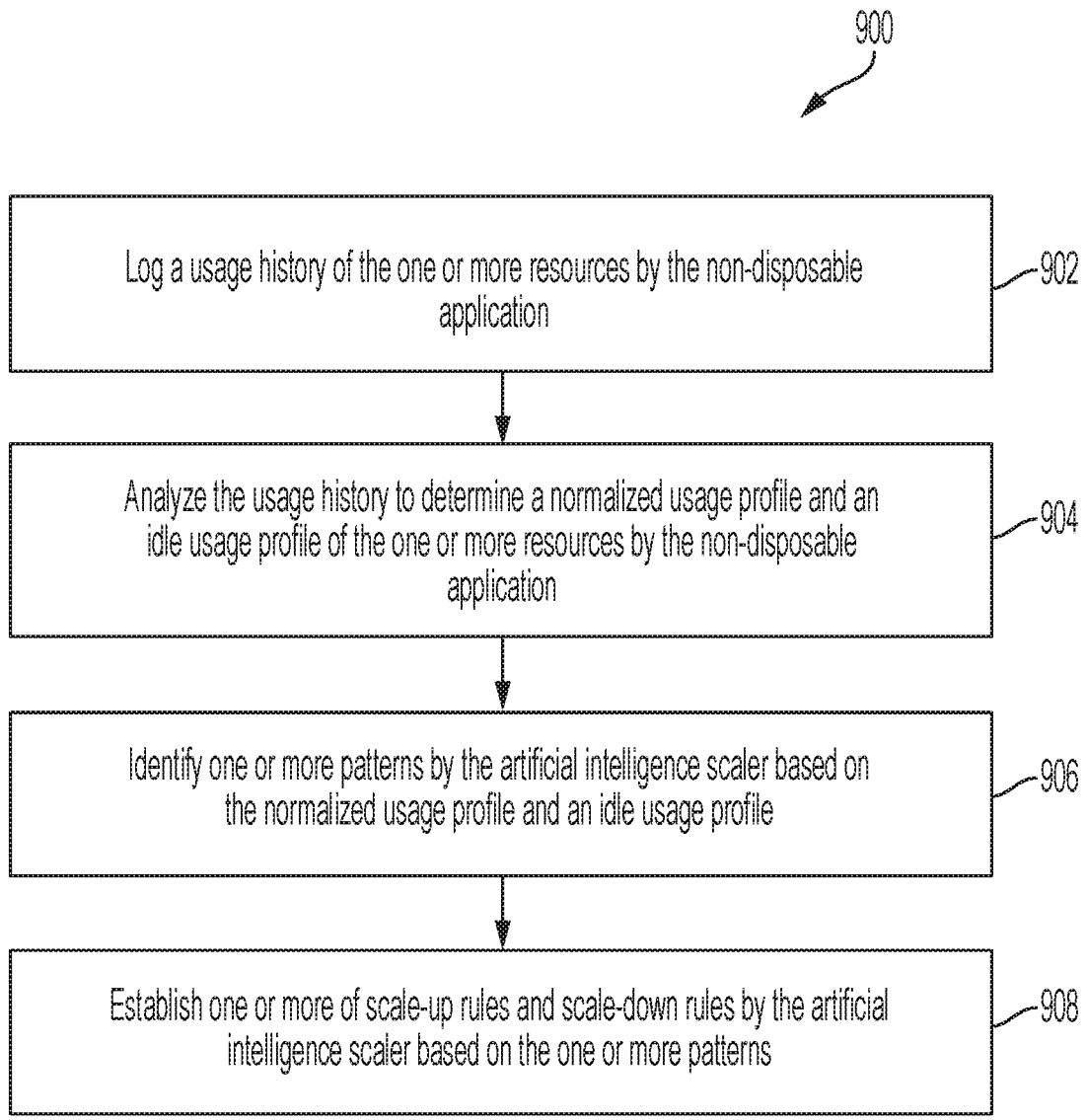
FIG. 9 depicts a process flow according to some embodiments of the present invention.

Turning now to FIG. 9, a process flow 900 is depicted according to an embodiment. The process flow 900 includes a number of steps that may be performed in the depicted sequence or in an alternate sequence. The process flow 900 may be performed by the system 100 of FIG. 1. In one embodiment, the process flow 900 is performed by the system management server 102 of FIG. 1 in combination with the cloud environment 105 and database server 134. The process flow 900 can comprise an extension of process flow 800 of FIG. 8. The process flow 900 is described in reference to FIGS. 1-9.

At step 902, the AI scaler 132 can log a usage history 138 of the one or more resources 114 by the non-disposable application 112. At step 904, the AI scaler 132 can analyze the usage history 138 to determine a normalized usage profile and an idle usage profile of the one or more resources 114 by the non-disposable application 112. The normalized usage profile can adjust a time scale that may differ between sampling intervals and may use averaging and interpolation to smooth the results. The idle usage profile can indicate parameters and conditions associated with a lower utilization of the resources 114.

At step 906, the AI scaler 132 can identify one or more patterns based on the normalized usage profile and an idle usage profile. The patterns can include, for example, identifying peak loading, average loading, and minimum load conditions over a period of time. Slope transitions between the different points in the usage profiles can assist with predicting trending in a particular direction (e.g., demand increasing or decreasing over time). The normalized usage profile, idle usage profile, and one or more patterns can be stored in the profiles and patterns 144.

At step 908, the AI scaler 132 can establish one or more of scale-up rules and scale-down rules based on the one or more patterns. The one or more of the scale-up rules and the scale-down rules can include a time component. For example, a time-of-day and day-of-week can impact when demand patterns are more likely. Scale-up rules may include localized and global parameters to determine a likely impact to other cloud applications 108 if scaling up is predictively performed. Similarly, scale-down rules can use localized and global parameters to determine whether scaling down will likely result in a net benefit by freeing resources 114 for other cloud applications 108 to use. The scale-up rules and scale-down rules can be stored in the constraints and rules 146. The constraints and rules 146 may also be viewable and editable by administrators to support customization, analysis, and testing scenarios.

Figure 10:
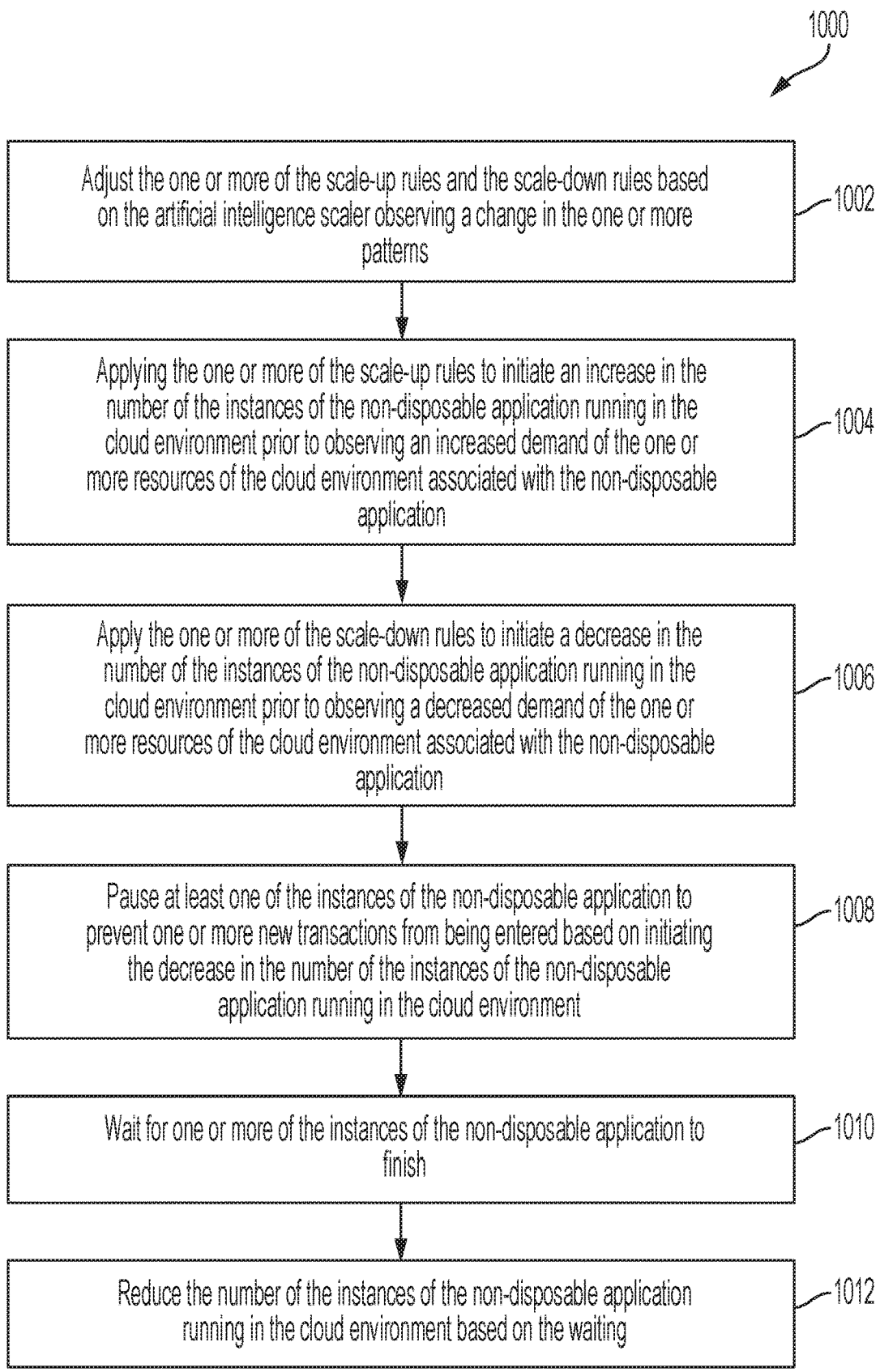
FIG. 10 depicts a process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the system management server 102 of FIG. 1 in combination with the cloud environment 105 and database server 134. The process flow 1000 can expand upon the process flow 900 of FIG. 9. The process flow 1000 is described in reference to FIGS. 1-10.

At step 1002, the AI scaler 132 can adjust one or more of the scale-up rules and the scale-down rules based on observing a change in one or more patterns. At step 1004, the AI scaler 132 can apply the one or more of the scale-up rules to initiate an increase in the number of the instances of the non-disposable application 112 running in the cloud environment 105 prior to observing an increased demand of the one or more resources 114 of the cloud environment 105 associated with the non-disposable application 112.

At step 1006, the AI scaler 132 can apply the one or more of the scale-down rules to initiate a decrease in the number of the instances of the non-disposable application 112 running in the cloud environment 105 prior to observing a decreased demand of the one or more resources of the cloud environment 105 associated with the non-disposable application 112.

At step 1008, the AI scaler 132 can pause at least one of the instances of the non-disposable application 112 to prevent one or more new transactions from being entered based on initiating the decrease in the number of the instances of the non-disposable application 112 running in the cloud environment 105. At step 1010, the AI scaler 132 can wait for one or more of the instances of the non-disposable application 112 to finish. At step 1012, the AI scaler 132 can reduce the number of the instances of the non-disposable application 112 running in the cloud environment 105 based on the waiting.

Technical effects include increasing cloud environment resource allocation efficiency through predictive scaling of non-disposable applications that would not otherwise support scaling in the cloud environment.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a processing system; and
   a memory system in communication with the processing system, the memory system storing instructions that when executed by the processing system result in:
   identifying a cloud application in a cloud environment as a non-disposable application, wherein the cloud application is identified as the non-disposable application based on determining that the cloud application complies with less than a predetermined number of a plurality of design constraints to support dynamic deployment in the cloud environment;
   monitoring a plurality of instances of the non-disposable application running in the cloud environment;
   determining that a number of the instances of the non-disposable application should be modified based on one or more demand predictions by an artificial intelligence scaler;
   adjusting the number of the instances of the non-disposable application running in the cloud environment based on the one or more demand predictions; and
   modifying an allocation of one or more resources of the cloud environment associated with adjusting the number of the instances of the non-disposable application.

2. The system of claim 1, wherein identifying the non-disposable application comprises performing a multi-factor check of the cloud application to determine whether the cloud application complies with the plurality of design constraints to support dynamic deployment in the cloud environment.

3. The system of claim 2, wherein the cloud application is identified as a disposable application based on determining that the cloud application complies with the design constraints to support dynamic deployment in the cloud environment.

4. The system of claim 3, further comprising instructions that when executed by the processing device result in:
using an auto-scaler associated with the cloud environment to scale up and scale down the cloud application based on determining that the cloud application is the disposable application.

5. The system of claim 1, wherein monitoring the instances of the non-disposable application running in the cloud environment comprises monitoring usage of the one or more resources associated with the non-disposable application in the cloud environment, and wherein the one or more resources comprise one or more of processor resources, memory resources, disk resources, and virtual machine resources.

6. The system of claim 5, further comprising instructions that when executed by the processing device result in:
   logging a usage history of the one or more resources by the non-disposable application;
   analyzing the usage history to determine a normalized usage profile and an idle usage profile of the one or more resources by the non-disposable application;
   identifying one or more patterns by the artificial intelligence scaler based on the normalized usage profile and an idle usage profile; and
   establishing one or more of scale-up rules and scale-down rules by the artificial intelligence scaler based on the one or more patterns.

7. The system of claim 6, wherein the one or more of the scale-up rules and the scale-down rules comprise a time component.

8. The system of claim 6, further comprising instructions that when executed by the processing device result in:
   adjusting the one or more of the scale-up rules and the scale-down rules based on the artificial intelligence scaler observing a change in the one or more patterns.

9. The system of claim 8, further comprising instructions that when executed by the processing device result in:
   applying the one or more of the scale-up rules to initiate an increase in the number of the instances of the non-disposable application running in the cloud environment prior to observing an increased demand of the one or more resources of the cloud environment associated with the non-disposable application; and
   applying the one or more of the scale-down rules to initiate a decrease in the number of the instances of the non-disposable application running in the cloud environment prior to observing a decreased demand of the one or more resources of the cloud environment associated with the non-disposable application.

10. The system of claim 9, further comprising instructions that when executed by the processing device result in:
    pausing at least one of the instances of the non-disposable application to prevent one or more new transactions from being entered based on initiating the decrease in the number of the instances of the non-disposable application running in the cloud environment;
    waiting for one or more of the instances of the non-disposable application to finish; and
    reducing the number of the instances of the non-disposable application running in the cloud environment based on the waiting.

11. The system of claim 1, wherein the one or more demand predictions are based on detecting one or more patterns indicative of a resource demand increase or a resource demand decrease.

12. The system of claim 11, further comprising instructions that when executed by the processing device result in:
    triggering an alert based on detection by the artificial intelligence scaler of one or more irregular patterns of resource demands, wherein the irregular patterns are identified based on a level of deviation from one or more expected patterns of resource demands.

13. The system of claim 1, further comprising instructions that when executed by the processing device result in:
training the artificial intelligence scaler with a plurality of test loads applied to the one or more resources of the cloud environment.

14. The system of claim 1, wherein the artificial intelligence scaler comprises a software service executed remotely from the cloud environment.

15. The system of claim 1, wherein monitoring the plurality of instances of the non-disposable application running in the cloud environment is performed at a predetermined time interval through an application programming interface of the cloud environment.

16. The system of claim 1, further comprising instructions that when executed by the processing device result in:
writing a plurality of results of monitoring the instances of the non-disposable application into a log file at a first interval; and
analyzing content of the log file to identify one or more patterns by the artificial intelligence scaler at a second interval.

17. A computer program product comprising a storage medium embodied with computer program instructions that when executed by a computer cause the computer to implement:
identifying a cloud application in a cloud environment as a non-disposable application, wherein the cloud application is identified as the non-disposable application based on determining that the cloud application complies with less than a predetermined number of a plurality of design constraints to support dynamic deployment in the cloud environment;
monitoring a plurality of instances of the non-disposable application running in the cloud environment;
determining that a number of the instances of the non-disposable application should be modified based on one or more demand predictions by an artificial intelligence scaler;
adjusting the number of the instances of the non-disposable application running in the cloud environment based on the one or more demand predictions; and
modifying an allocation of one or more resources of the cloud environment associated with adjusting the number of the instances of the non-disposable application.

18. The computer program product of claim 17, wherein identifying the non-disposable application comprises performing a multi-factor check of the cloud application to determine whether the cloud application complies with the plurality of design constraints to support dynamic deployment in the cloud environment.

19. The computer program product of claim 18, wherein the cloud application is identified as a disposable application based on determining that the cloud application complies with the design constraints to support dynamic deployment in the cloud environment.

20. The computer program product of claim 17, wherein monitoring the instances of the non-disposable application running in the cloud environment comprises monitoring usage of the one or more resources associated with the non-disposable application in the cloud environment, and wherein the one or more resources comprise one or more of processor resources, memory resources, disk resources, and virtual machine resources.

21. The computer program product of claim 20, wherein further comprising computer program instructions that when executed by the computer cause the computer to implement:
logging a usage history of the one or more resources by the non-disposable application;
analyzing the usage history to determine a normalized usage profile and an idle usage profile of the one or more resources by the non-disposable application;
identifying one or more patterns by the artificial intelligence scaler based on the normalized usage profile and an idle usage profile; and
establishing one or more of scale-up rules and scale-down rules by the artificial intelligence scaler based on the one or more patterns.

22. The computer program product of claim 21, wherein the one or more of the scale-up rules and the scale-down rules comprise a time component, and further comprising computer program instructions that when executed by the computer cause the computer to implement:
adjusting the one or more of the scale-up rules and the scale-down rules based on the artificial intelligence scaler observing a change in the one or more patterns;
applying the one or more of the scale-up rules to initiate an increase in the number of the instances of the non-disposable application running in the cloud environment prior to observing an increased demand of the one or more resources of the cloud environment associated with the non-disposable application; and
applying the one or more of the scale-down rules to initiate a decrease in the number of the instances of the non-disposable application running in the cloud environment prior to observing a decreased demand of the one or more resources of the cloud environment associated with the non-disposable application.

23. The computer program product of claim 22, further comprising computer program instructions that when executed by the computer cause the computer to implement:
pausing at least one of the instances of the non-disposable application to prevent one or more new transactions from being entered based on initiating the decrease in the number of the instances of the non-disposable application running in the cloud environment;
waiting for one or more of the instances of the non-disposable application to finish; and
reducing the number of the instances of the non-disposable application running in the cloud environment based on the waiting.

24. The computer program product of claim 17, wherein the one or more demand predictions are based on detecting one or more patterns indicative of a resource demand increase or a resource demand decrease, and further comprising computer program instructions that when executed by the computer cause the computer to implement:
triggering an alert based on detection by the artificial intelligence scaler of one or more irregular patterns of resource demands, wherein the irregular patterns are identified based on a level of deviation from one or more expected patterns of resource demands.

25. The computer program product of claim 17, wherein training the artificial intelligence scaler with a plurality of test loads applied to the one or more resources of the cloud environment, and the artificial intelligence scaler comprises a software service executed remotely from the cloud environment.

26. The computer program product of claim 17, wherein monitoring the plurality of instances of the non-disposable application running in the cloud environment is performed at a predetermined time interval through an application programming interface of the cloud environment.

\* \* \* \* \*